United States Patent [19]

Kreamer

[11] Patent Number: 4,498,457
[45] Date of Patent: Feb. 12, 1985

[54] CONTROL FOR SOLAR SYSTEM

[76] Inventor: William Kreamer, P.O. Box 673, St. Jospeh, Mich. 49085

[21] Appl. No.: 487,619

[22] Filed: Apr. 22, 1983

[51] Int. Cl.³ ................................................ F24J 3/02
[52] U.S. Cl. ..................................... 126/429; 126/419; 126/422; 126/432
[58] Field of Search .............. 126/418, 419, 429, 432, 126/422; 236/93 A

[56] References Cited

U.S. PATENT DOCUMENTS 4,175,697 11/1979 Dreibelblis .................. 236/93 A
4,237,865 12/1980 Lorenz ............................ 126/429
4,382,436 5/1983 Hager .............................. 126/429

Primary Examiner—Henry Bennett
Attorney, Agent, or Firm—W. R. Hulbert

[57] ABSTRACT

A modular space-heating solar system has integral air-handling controls which automatically select a heating mode, a venting mode, or a variable combination of the two, according to room temperature. This eliminates the potential capability of the solar system of over-heating the room, and maintains full air flow through the solar absorber so as to prevent damage and increase useful life of the system.

Incorporation of the controls into the collector enclosure allows simple installation of this integrated solar system as a single unit complete with collecting, sensing, actuating and air-handling functions.

4 Claims, 3 Drawing Figures

U.S. Patent  Feb. 12, 1985  4,498,457
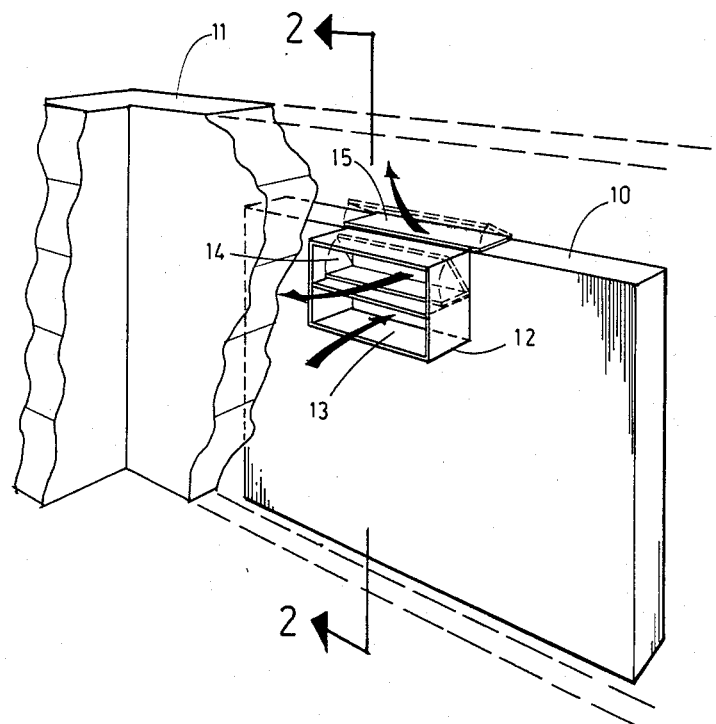
FIG. 1
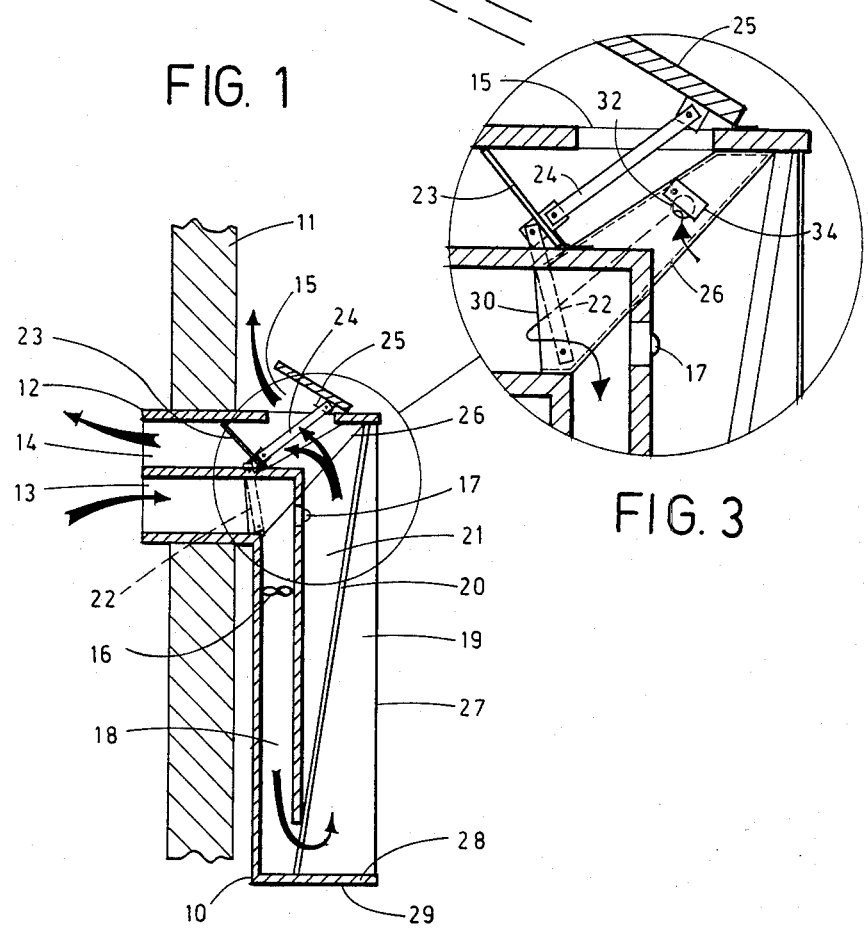
FIG. 2
FIG. 3

CONTROL FOR SOLAR SYSTEM

FIELD OF THE INVENTION

My invention relates to solar energy collecting apparatus, and more particularly to a room-air-heating solar energy system with novel integral controls.

PRIOR ART

In the past, solar energy collectors for heating air have served no useful purpose in warm weather. These must be removed or covered to eliminate inappropriate heat production, rather than simply disabling the fans or blocking the flow of air, which can cause stagnation over-heating damage. Some prior art collectors have enclosure vents to reduce stagnation temperatures, but these do not permit normal cooling air flow, and do not have a comfort-related function.

OBJECTS AND ADVANTAGES OF THE INVENTION

An object of the present invention is to provide solar-heated air to the room when it is at or below a comfortable temperature. Another object is to cause hot weather room ventilation thus providing a hot weather comfort function. Another object is to provide for automatic operation by switching between room heating and room venting automatically, in logical response to room temperature. Another object is to allow the mode-switching temperature to be adjusted by the user. Another object of the present invention is to provide a flow of air through the solar absorber whenever it is heated by solar irriadiation, so as to prevent over-heating damage due to stagnation. Another object is to provide a modular system, i.e. one containing all elements in a single enclosure, affording simplified installation. Another object is to provide normal control functioning in the absence of electrical power. Another object is to provide a geometry of flow path which will promote vigorous thermo-syphoning. Another object is to provide a geometry of flow path which will stifle anti-syphoning without a mechanical damper.

SUMMARY OF THE INVENTION

In accordance with the invention I provide in a solar heating system for heating an enclosed space wherein air from said space is directed into the system through an inlet port, heated by being passed over an absorber of solar energy and then directed through an outlet port into the space to be heated, the improvement comprising a vent to the exterior, closure means for the outlet port and vent, and temperature-sensitive means for operating the closure means responsive to the temperature of the air entering the system from said space for simultaneously closing the outlet port and opening the vent so that heated air is diverted to the exterior through the vent when a predetermined temperature is sensed. In preferred embodiments, said temperature-sensitive means comprises an actuator linked to the closure means for simultaneously closing the outlet port and opening the vent and vice versa; the actuator comprises a phase-change thermal actuator mounted in the inlet port and linked directly to the closure means; means for introducing a portion of the heat from the absorber is used in conjunction with the heat of the inlet air to further control the action of the actuator; heat introducing means comprises a duct for conducting some of the heated air from the absorber to the actuator; and means for adjusting the flow of the thus diverted heated air.

Further objects, features and advantages of the invention will become apparent from the following non-limiting description of a preferred embodiment taken in conjunction with the accompanying drawings.

BRIEF DESCRIPTION OF THE DRAWINGS

FIG. 1 is a perspective view of a wall-mounted system module showing the location of the inlet, outlet, and vent ports.

FIG. 2 is a vertical section through the module on an enlarged scale taken on line 2—2 of FIG. 1 showing the geometry of the air-flow paths and the locations of the various elements of the control system.

FIG. 3 is a detailed view on a still larger scale of a portion of the control system showing the means by which the mode-switching temperature is adjusted.

DETAILED DESCRIPTION OF PREFERRED EMBODIMENT

Referring now to the drawings, in FIG. 1 there is shown a solar system module designated by numeral 10 mounted on an exterior building wall 11 having an air-flow manifold 12 containing an inlet port 13 and an outlet port 14 projecting through the wall 11 into the interior space in the building. In the upper portion of the module 10 is an exterior vent port 15.

Referring to FIG. 2, there is shown a fan 16 controlled by a thermostat 17 (conventional motor and electrical circuitry not shown). The fan moves air along a path defined by room inlet port 13, distribution duct 18, low temperature chamber 19, solar energy absorbing body 20, high temperature chamber 21, and, lastly, either room outlet port 14 or exterior vent port 15. The path taken depends on the state of the novel control system, consisting of phase-change thermal actuator 22, outlet port damper 23, connecting link 24, vent closure 25, and unifying frame 26. The damper 23 and vent closure 25 are interconnected by the link 24 so that as the vent port 15 is closed by the vent closure 25, the damper 23 simultaneously opens the outlet port 14. In the reverse motion, as the vent port 15 is opened by vent closure 25, the connecting link 24 causes the damper 23 to simultaneously close the outlet port 14. Thus an open flow path is always maintained, and the module 10 is protected from overheating damage caused by stagnation, i.e. stopping the air-flow. As shown in FIGS. 2 and 3, the phase-change thermal actuator 22 is connected to damper 23 and thus operates both the damper 23 and the closure 25 simultaneously, by extending or retracting. In FIGS. 2 and 3 it is shown in extended condition, closing damper 23 and opening closure 25. The phase-change thermal actuator 22 extends or retracts due to the expansion or contraction of a confined phase-change material as it melts or freezes, expanding upon entering the liquid phase and contracting upon entering the solid phase. For typical home heating purposes the phase-change material is selected so that its melting point is in the upper region of the normal comfort range, i.e. the temperature region at which it is desired to stop the flow of heated air into the room. The phase-change actuator used as the operator for the control system exhibits its full movement as the sensed temperature changes only slightly. The movement is smooth and deliberate; the rate depends on the rate at which heat energy is supplied to or removed from the phase-change material by its surroundings. By causing a continuous flow of room air to be drawn across the actuator whenever solar energy is being collected, whether by thermosyphoning action or by fan drive, the proper and timely positioning of the control system air-handling elements, and hence the proper disposition of the output, is ensured. The effect of regular movement of the control system elements on the ratio of heating to venting is likewise regular and immediate. If the full heating capacity of the solar system of the present invention is greater than the heating requirement of the room, the controls will reduce the heating action of the system by simultaneously decreasing output flow (recirculated to the room) and increasing venting flow (exhausted from the room).

Referring to FIG. 3 there is shown means for diverting a portion of solar-heated air, said means comprising the interior of the frame 26 acting as an air-flow duct 30, bringing air which is drawn from the high temperature chamber 21 through the variable orifice 32, at a rate governed by the moveable orifice control 34, into contact with actuator 22. This flow of diverted heated air to the phase-change actuator 22, thus serves to bias the ambient air temperature near the actuator 22 by an amount governed by the orifice control 34, thus permitting a measure of control over the physical state of the phase-change actuator even though the inlet air temperature may be constant. Thus, the room temperature set-point at which the operation of the present invention changes from heating to venting may be selected by the user by adjusting the orifice control 32.

The geometry of the flow path is chosen so that in solar collecting conditions natural thermosyphoning action will bring only room air in contact with the actuator 22 and its phase-change material. This allows it to sense the correct temperature of the room even when the fan 16 is not operating, as in a power failure, and causes the control set-point to substantially equal the melting temperature of the phase-change material. A stable dynamic-equilibrium position of the controls may be reached at which the phase-change material resides with its liquid and solid phases in equilibrium.

At night, or anytime the sun is not irradiating the module 10, the air flow essentially ceases and the actuator 22 and the entire exterior of module 10 assume the outside ambient temperature. If the ambient temperature is lower than the comfort range, the control system will be in the heating mode, that is, the vent port 15 will be closed and the room outlet port 14 will be open. Thus the module 10 is ready to heat the room as soon as solar collecting conditions prevail. If, however, the ambient temperature is higher than the comfort range, then the control system will be in the venting mode, that is, the vent port 15 will be open and the room outlet port 14 will be closed. Under these conditions, the module 10 is ready to vent the room as soon as solar collecting conditions prevail.

The proper action of the control system depends on the rotational axes of the various elements of the system maintaining their proper relative positions. For this reason all control system elements are mounted on a rigid unifying frame 26. This also forms a structural brace for the case of the module.

The thermal phase-change actuator is well known to those skilled in the art, models being available from several manufactures. In the solar system of the present invention, I use a model whose details, specifications and prices are available from Dalen Products, Inc., Knoxville, TN. I make an additive modification to the actuator to allow excess motion to be absorbed by a compression-spring device well known to those skilled in the art.

The novel control scheme producing the characteristic action of the present invention may be used to control many well known air-cooled solar collectors, but certain provisions make for effective cooperation between collector and controls. These are the following:

(a) The "phase-change actuator" ("P.C.A.") should be located within the inlet flow stream.

(b) The collector should be designed to promote vigorous thermo-syphoning so that the "P.C.A." is continuously sensing room temperature, and not an anomalous higher temperature resulting from stagnation of the air flow.

(c) The exterior vent should be located in the top of the solar system enclosure so that the thermo-syphoning will continue during venting.

(d) The inlet duct and the outlet duct should be contiguous with the exterior vent location so that the connections between the inlet's actuator and the outlet's damper, and between the damper and the exterior vent can be simply accomplished.

Considering these provisions, I have found that many prior art air-type solar collectors may be controlled as described herein. One such collector is a "Solar Heating Unit," U.S. Pat. No. 4,121,565 issued Oct. 24, 1978, to Robert B. Grisbrook.

Another such collector is a "Solar Panel," U.S. Pat. No. Re. 30,136 issued Nov. 6, 1979.

The present invention and these prior art solar collectors have other functional elements and provisions well known to those skilled in the art. Referring again to FIG. 2, these include a suitable glazing 27 (whether single or double), insulation 28, and weatherable exterior surface 29.

The foregoing detailed description of a presently preferred embodiment of the invention is intended to be by way of illustration and not by way of limitation. It is intended that the scope of the invention be limited only by the proper interpretation of the appended claims.

I claim:

1. In an exteriorly mounted solar heating system for heating an enclosed space such as a room in a building wherein air from said space is directed into the system housing through an inlet port, heated by being passed over an absorber exposed to solar energy and then redirected through an outlet port into said space, an improved control comprising means for providing a vent to atmosphere from the top of said system housing enclosure members for said outlet port and said vent a temperature sensitive actuator connected to said members for simultaneously opening said outlet port and closing said vent and vice versa said actuator being exposed to and sensing the temperature of air from said enclosed space passing through said inlet port and being powered solely by temperature sensitive phase-change material which exhibits a melting temperature in the upper region of the normal comfort range, changing phase responsive to the temperature sensed whereby air heated by passing over said absorber is either vented to atmosphere when air passing from said space reaches a pre-determined elevated temperature or redirected into said space when said passing air drops to a pre-determined lower temperature, and means for biasing the temperature of air sensed by said actuator so as to adjust said control's effective room temperature set-point said biasing means comprising means for introducing a controllable fraction of air heated by said absorber into the air from said space to which the actuator is exposed so that it may sense the temperature of the combination.

2. The system of claim 1 wherein said actuator is mounted in said inlet port and linked directly to said closure means.

3. The system of claim 1 wherein said biasing means includes a duct for conducting some of the heated air from the downstream side of the said absorber to said actuator.

4. The system of claim 3 including means for adjusting the flow of the thus conducted heated air.

* * * * *

UNITED STATES PATENT AND TRADEMARK OFFICE
CERTIFICATE OF CORRECTION

PATENT NO. : 4,498,457
DATED : February 12, 1985
INVENTOR(S) : William Kreamer

It is certified that error appears in the above-identified patent and that said Letters Patent are hereby corrected as shown below:

Col 1, line 34: "irriadiation" should be --irradiation--

Col. 3, line 65: "manufactures" should be --manufacturers--

Col. 4, line 50: Delete "for" after "means"

Col. 4, line 52: "enclosure" should be --closure--

Signed and Sealed this

Fourth Day of June 1985

[SEAL]

Attest:

DONALD J. QUIGG

Attesting Officer     Acting Commissioner of Patents and Trademarks